United States Patent [19]

Wilson, Jr. et al.

[11] Patent Number: 5,713,389

[45] Date of Patent: Feb. 3, 1998

[54] CHECK VALVE AND CHECK VALVE SEAT

[75] Inventors: Michael E. Wilson, Jr., Spring; Roy C. Bates, Crosby, both of Tex.

[73] Assignee: FMC Corporation, Chicago, Ill.

[21] Appl. No.: 518,949

[22] Filed: Aug. 24, 1995

[51] Int. Cl.⁶ ........................................ F16K 15/00
[52] U.S. Cl. ................... 137/515.7; 137/527; 137/527.8
[58] Field of Search ......................... 137/527, 527.8, 137/515.7

[56] References Cited

U.S. PATENT DOCUMENTS

| Re. 21,334 | 1/1940 | White et al. | 137/69 |
|---|---|---|---|
| 326,549 | 9/1885 | D'este | 137/527 |
| 380,940 | 4/1888 | Schutte | 137/515.7 |
| 818,670 | 4/1906 | Dumbolton | 137/515.7 |
| 831,141 | 9/1906 | Cash | 137/515.7 |
| 1,286,672 | 12/1918 | Lindgren | 137/515.3 |
| 2,262,726 | 11/1941 | Nickerson | 137/515.3 |
| 3,144,876 | 8/1964 | Frye | 137/827.8 |
| 3,687,157 | 8/1972 | Whitmer | 137/527 |
| 4,128,111 | 12/1978 | Hansen | 137/515.7 |
| 4,274,436 | 6/1981 | Smith | 137/515.7 |
| 4,291,722 | 9/1981 | Churchman | 137/496 |
| 4,586,534 | 5/1986 | McNeely | 137/515.7 |
| 4,781,214 | 11/1988 | Scaramucci | 137/527 |
| 4,809,739 | 3/1989 | Scaramucci | 137/527.8 |
| 4,813,451 | 3/1989 | Scaramucci | 137/527.4 |
| 4,825,902 | 5/1989 | Heims | 137/527 |
| 4,967,790 | 11/1990 | Ganske | 137/527.8 |
| 5,044,396 | 9/1991 | Daudet et al. | 137/527.8 |
| 5,141,052 | 8/1992 | Bump | 137/527 |
| 5,386,847 | 2/1995 | Scaramucci | 137/527.8 |
| 5,522,423 | 6/1996 | Elliott | 137/527.8 |

OTHER PUBLICATIONS

*FMC Fluid Control Systems High–Pressure Check Valves*, FMC Corporation Brochure 1994, U.S.A.

*Primary Examiner*—Denise L. Ferensic
*Assistant Examiner*—Joanne Y. Kim
*Attorney, Agent, or Firm*—Henry C. Query, Jr.

[57] ABSTRACT

The present invention is directed to a check valve assembly comprising an upstream body member and a downstream body member which are joined in sealing engagement to thereby form a closed body; a generally ring-shaped seating member formed from a unitary piece of material and comprising a flat base surface positioned in said closed body with said flat base surface facing upstream, a flat top surface parallel to said flat base surface, a flow passage extending from said base surface to said top surface and a bore extending into said top surface toward said base surface, said bore defining an annular lip surrounding said flow passage and a recessed upward-angled planar top sealing surface; said seating member further comprising a cut-out segment formed in said lip which defines two extensions projecting axially from the top sealing surface and a transverse hole in each extension through which a hinge pin is received to connect a movable flapper lid to said seating member; said flapper lid comprising a flapper sealing surface adapted to sealingly engage the top sealing surface of the seating member to stop backflow when said regular flow pressure from upstream drops to a predetermined level causing the flapper to rest in the closed position,

8 Claims, 3 Drawing Sheets

CHECK VALVE AND CHECK VALVE SEAT

BACKGROUND OF THE INVENTION

The present invention relates generally to fluid handling systems and, more specifically, to check valves designed for use in isolating various components in a well or pumping assembly by preventing back flow to such assemblies in situations where there is a drop or reversal in regular flow pressure.

Check valves are used in a variety of applications in which it is desirable to provide means for preventing back flow when there is a drop or reversal in regular flow pressure. Check valves are used in fluid handling assemblies where it is desirable to trap back flow to prevent damage upstream or to stop back flow when regular flow is stopped in order to replace or service upstream components.

Typical check valves comprise two interfitting housing components with ends adapted to fit into a flow line. A hatch or flapper is positioned within the housing assembly to move into and out of a stop flow position in response to a drop in regular flow pressure in order to prevent back flow. The flapper is typically hinged to the valve body or housing assembly and positioned so that gravity or a spring bias will close the flapper over the flow path in the absence of regular flow pressure that is sufficient to overcome the spring bias or gravity force of the flapper.

Typical check valve assemblies include a seat assembly positioned in the valve housing in sealing contact therewith and encircling the flow path. The seat assembly provides a sealing surface around the flow path that cooperates with the flapper to form a closed seal around the flow path when the flapper is in the closed or stop flow position. The typical seat sealing surface is either vertically aligned or angled upward such that if the flapper is gravity activated, the hinge is positioned at the top of the sealing surface such that the flapper swings down and contacts the sealing surface prior to reaching a fully hanging position.

It is important that in the event of a pressure drop that the flapper forms an effective seal at low pressure. Even a minimal amount of back flow or leakage can introduce elements or present a condition that will result in erosion of the seat or flapper sealing surfaces, potentially leading to failure of the seal and the check valve.

In check valves where the seat sealing surface is vertically oriented, a torsion spring is generally required to provide sufficient sealing force between the flapper and the seat. Since a free-hanging hinged flapper will rest in a vertical position, a torsion spring is required to provide additional rotational force which will bias the flapper in the horizontal direction against a vertical seat. In check valves having flappers designed to engage seats under only gravitational force, the seat sealing surface is angled upward causing the flapper to contact the seat prior to the free-hanging vertical position so that the flapper weight causes a resultant force component to be directed against the seat.

Free-hanging flappers are advantageous in that by eliminating the torsion spring, the force from the regular flow pressure needed to overcome the flapper is minimized and thus the flapper swings out of the way of the flow with less resistance thereby minimizing erosion of the flapper and sealing surface caused by being in the flow path. Also, the potential for spring failure due to fatigue or wear is eliminated.

Typical check valves require a hinge-pin assembly that is fixed relative to the inside of the valve housing. The hinge-pin assembly usually includes a pin having one or more fastening means extending through or into the housing, requiring additional structural and sealing components. Such construction requires the components for the seat assembly, the flapper and hinge assembly, and the flapper spring to be numerous, complex, and expensive. Replacement and field servicing for such check valve assemblies is expensive, time consuming and difficult. In addition, there are more components subject to erosion and wear.

It is therefore an object of the present invention to overcome the shortcomings mentioned above and to provide a simple, durable and reliable check valve that requires few components and is efficient to machine, assemble and service.

SUMMARY OF THE INVENTION

The present invention is directed to a check valve and method for making the same, wherein the check valve comprises a single-piece valve seat having integral hinge-pin supports and an angular seat profile adapted to form a seal with a movable flapper.

DETAILED DESCRIPTION OF THE DRAWINGS

Figure 1:
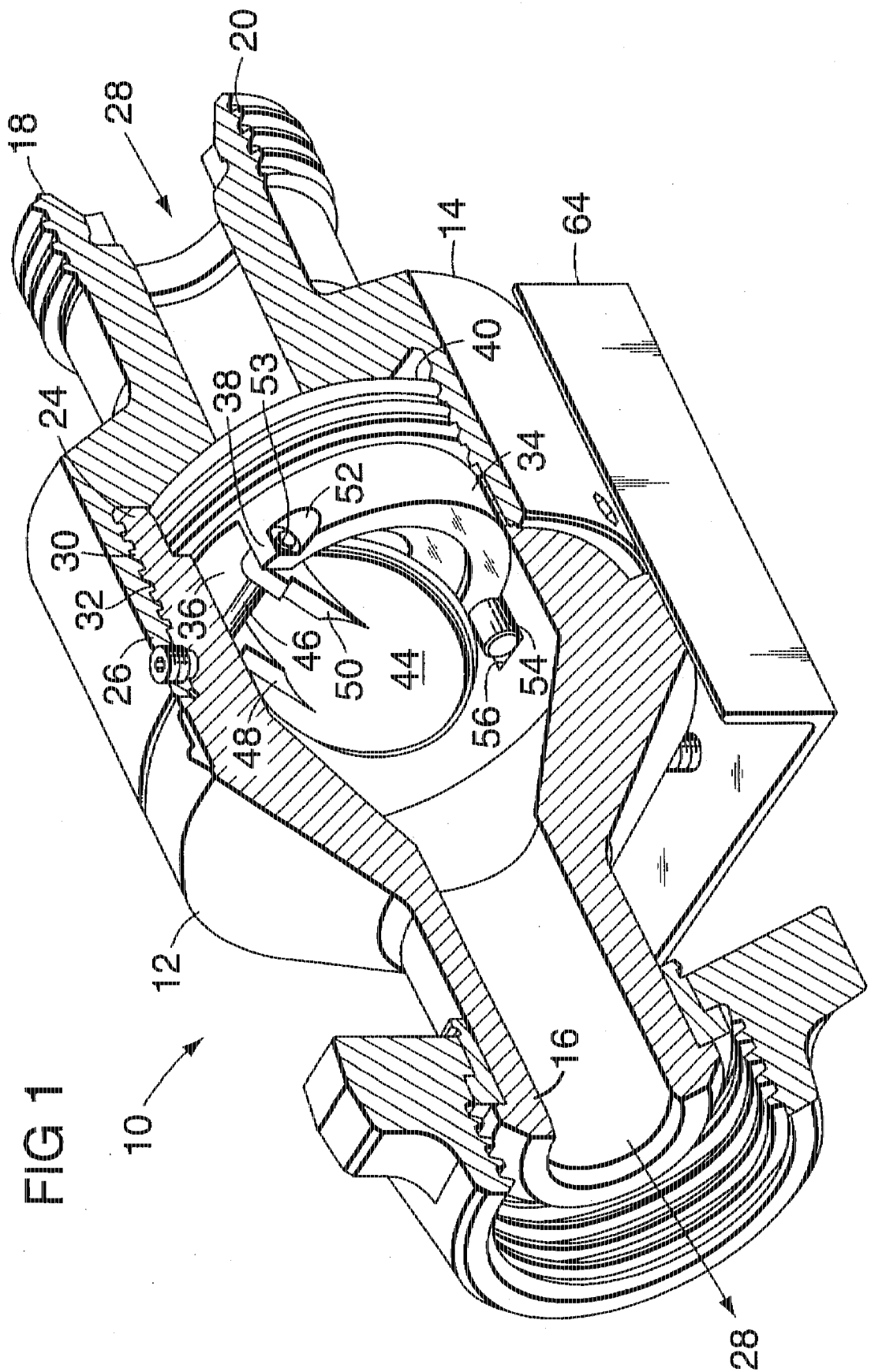
FIG. 1 is a partial sectional view of the present invention check valve.
Figure 2:
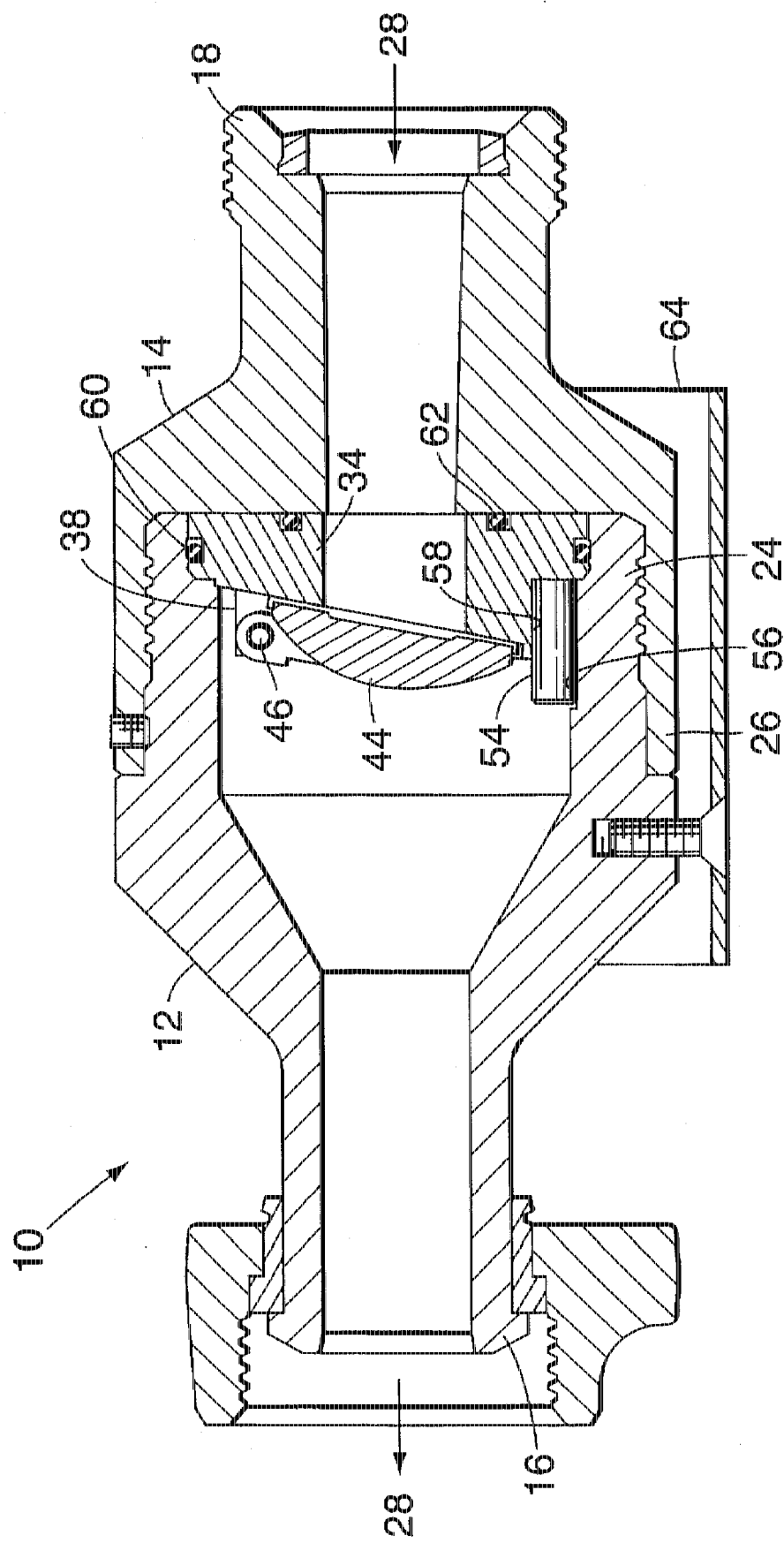
FIG. 2 is a cross-sectional view of the check valve of FIG. 1.
Figure 3:
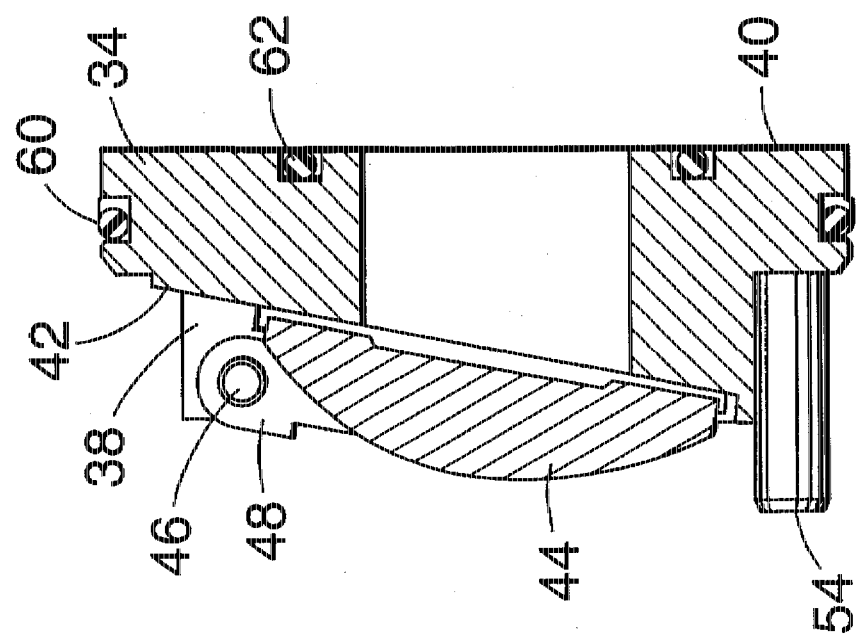
FIG. 3 is a cross-sectional view of the flapper, seat and hinge assembly of the present invention check valve of FIG. 1.
Figure 4:
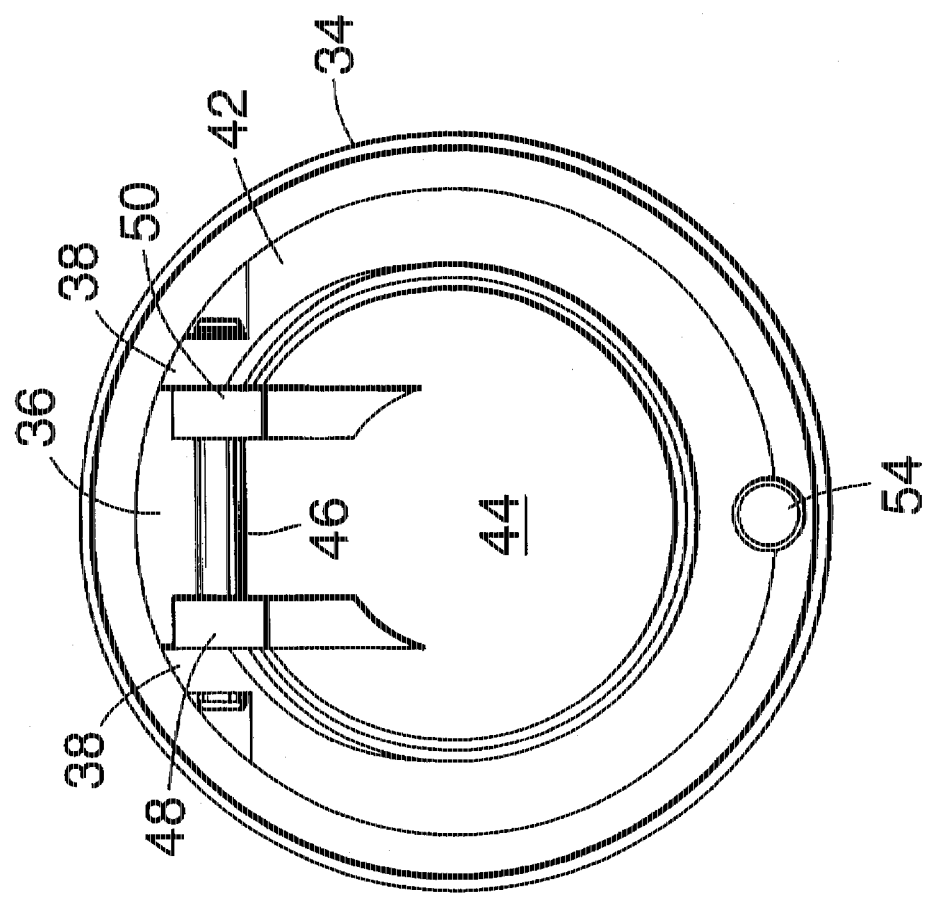
FIG. 4 is a front view of the assembly of FIG. 3.

A check valve assembly according to the present invention (10) is shown generally in FIGS. 1 and 2. The assembly (10) comprises two interfitting housing portions (12,14) each having an outside end (16,18) adapted to be fitted into the flow path of a conventional flow line (not shown). The outside ends (16,18) may include threads (20), as shown in FIG. 1, or other known means for sealing attachment to a flow line. Each housing portion (12,14) has an inside end (24,26) adapted to interfit with the other in sealing relation thereby forming a closed flow path (28) therethrough. The inside ends (24,26) may be fitted with threads (30,32) as shown in FIG. 1 or other known means for interfitting. The embodiment of FIG. 1 shows a first housing portion inside end (24) received inside a second housing portion end (26).

A unitary seat and flapper mounting component (34), having a generally ring-shaped configuration, is positioned internally between the housing portions (12,14) and around the flow path (28). The seat component (34) is machined with flapper-mounting means (36,38) from a single piece of material. The base (40) of the seat component (34) has a flat profile that seats against the second housing portion (14) and a planar top surface (42) that is arranged to form an upwardly angled plane when positioned in the check valve housing portions (12,14). The seat component (34) also comprises a flat top surface parallel to the base (40), and the planar top surface (42) is formed by an axial bore extending into the flat top surface toward the base (40). As best seen in FIG. 1, this bore defines an annular lip surrounding the flow path (28) between the flat top surface and the planar top surface (42). The flapper-mounting means (36,38) are formed integrally on the seat component (34) at a location at the upper portion of the annular lip such that a flapper or lid

(44) can be suspended therefrom to hang over the flow path (28). A hinge-pin (46) attaches the flapper (44) to the flapper-mounting means (36,38) through hinge arms (48,50) provided near the outer edge of the flapper (44). The flapper-mounting means (36,38) comprise a cut-out portion (36) of the planar top surface (42) and resulting extensions (38) to receive the hinge-pin (46) through pin access clearances (52) on the side of the extensions (38) opposite the cut-out portion (36) and pin holes (53) through the extensions (38).

The assembly of the seat component (34), the flapper (44) and the hinge-pin (46) is positioned with the closed structure formed by the interfitting housing portions (12,14). The seat component (34) is oriented and held in place by an alignment pin (54) received in a semi-circular profiled hole (56,58) in each of the downstream housing portion (12) and the seat component (34), respectively. Suitable seals such as o-rings (60,62) are provided to seal the flow path (28) inside the check valve assembly (10). A base support (64) can be provided to support the check valve assembly (10).

In operation, regular fluid flow passes through the check valve assembly (10) in the direction indicated by the flow path line (28) in FIGS. 1-2. The pressure of the fluid flow causes the flapper (44) to swing about the hinge-pin (46) upwardly, enabling fluid to flow through. Though it is not required, it is desirable to provide for the flapper (44) to swing through a range of approximately ninety degrees or less. An optimum angle for the planar top surface (42), measured from the vertical, is approximately ten degrees.

In the event that upstream pressure is decreased, removed or reversed, the flapper (44) will move into the closed position as shown in FIG. 2 under the force of gravity, thereby forming a seal with the planar top surface (42). It is understood that the present invention can be practiced with the use of a conventional torsion spring (not shown) or similar means at the hinge to provide additional sealing or flapper-closing force. The portion of the flapper (44) that contacts the planar top surface (42) can be provided with an elastomer or other preferred seal face material.

Assembly of the check valve means is provided as follows. The o-ring seals (60,62) and other seal means are lubricated and installed to the seat component (34) for insertion into the housing (12,14) therewith. The flapper hinge arms (48,50) are aligned between the seat component extensions (38) so that the hinge-pin (46) can pass through and freely rotate. The alignment pin (54) is inserted into the semicircular hole (58) of the seat component (34). The above mentioned assembly is inserted into the cavity of the body housing (12) and aligned so that the alignment pin (54) is received in the semi-circular hole (56) therein. Additional seals and lubricants as desired are added to the seat component to interface with the other body housing (14). The upstream body housing (14) is then attached to the downstream housing (12) to enclose the seat component (34) and flapper (44) assembly therein. Set screws and other conventional fastening means can be used to attached the body housings. The entire assembly can then be fixed to a base support (64).

It is understood that the embodiment disclosed herein is the best mode of a variety of embodiments that encompass the scope of the present invention. Accordingly, it is understood that there may be some variations without departing from the scope of the presently claimed invention.

What is claimed is:

1. A check valve assembly for preventing back flow in a flow path when regular flow pressure drops to a predetermined level, said check valve assembly comprising:

an upstream body member of a generally cylindrical shape having an upstream opening at an upstream side adapted to sealingly engage a flow line, and having a mating portion with an opening at a downstream side;

a downstream body member of a generally cylindrical shape having a downstream opening at a downstream side adapted to sealingly engage a flow line, and having a mating portion with an opening at an upstream side, whereby said upstream and said downstream body members are joined at said mating portions, respectively, in sealing engagement thereby forming a closed body which forms part of said flow path;

a generally ring-shaped seating member formed from a unitary piece of material and comprising a flat base surface positioned in said closed body with said flat base surface facing upstream, a flat top surface parallel to said flat base surface, a flow passage extending from said base surface to said top surface and a bore extending into said top surface toward said base surface, said bore defining an annular lip surrounding said flow passage and a recessed upward-angled planar top sealing surface;

said seating member further comprising a cut-out segment formed in said lip which defines two extensions projecting axially from the top sealing surface and a transverse hole in each extension through which a hinge pin is received to connect a movable flapper lid to said seating member;

said flapper lid comprising a flapper sealing surface adapted to sealingly engage the top sealing surface of the seating member to stop backflow when said regular flow pressure from upstream drops to a predetermined level causing the flapper to rest in the closed position.

2. The check valve assembly according to claim 1, wherein:

the upwardly-angled planar top sealing surface is oriented along an upward-facing plane oriented approximately ten degrees from a vertical plane.

3. The check valve assembly according to claim 1, wherein:

said seating member and said flapper lid are assembled such that they can be removed from or installed into said check valve assembly together as a single unit.

4. The check valve assembly according to claim 1, further comprising:

alignment means for angularly orienting said seating member about said flow path in said closed body.

5. The check valve assembly according to claim 4, wherein:

said alignment means comprise a pin.

6. A seat and flapper assembly for use in a check valve having a housing with an upstream side and a downstream side, wherein said check valve is adapted to prevent backflow in a flow path when upstream regular flow pressure drops to a predetermined level, said assembly comprising:

a generally ring-shaped seating member having a passage therethrough and positioned within said housing such that said passage forms part of said flow path, said seating member formed form a unitary piece of material and comprising a flat base surface positioned in said housing with said flat base surface facing upstream, a flat top surface parallel to said flat base surface and a bore extending into said top surface toward said base surface, said bore defining an annular lip surrounding said flow passage and a recessed upward-angled planar top sealing surface;

said seating member further comprising a cut-out segment formed in said lip which defines two extensions projecting axially from the top sealing surface and a transverse hole in each extension through which a hinge pin is received to connect a movable flapper lid to said seating member;

said flapper lid comprising a flapper sealing surface adapted to sealingly engage the top sealing surface of the seating member to stop backflow when said regular flow pressure from upstream drops to a predetermined level causing the flapper lid to rest in the closed position.

7. The assembly according to claim 6, wherein:

the upwardly-angled planar top sealing surface is oriented along an upward-facing plane oriented approximately ten degrees from a vertical plane.

8. The assembly according to claim 7, wherein:

said seating member, said flapper lid and said hinge pin are assembled such that they can be removed from or installed into said check valve assembly together as a single unit.

* * * * *